US008464598B2

(12) United States Patent
Cazaux et al.

(10) Patent No.: US 8,464,598 B2
(45) Date of Patent: Jun. 18, 2013

(54) DEVICE FOR MEASURING THE TORQUE TRANSMITTED BY A POWER SHAFT

(75) Inventors: Yannick Cazaux, Arbus (FR); Gerald Senger, Morlaas-Berlanne (FR)

(73) Assignee: Turbomeca, Bordes (FR)

( * ) Notice: Subject to any disclaimer, the term of this patent is extended or adjusted under 35 U.S.C. 154(b) by 310 days.

(21) Appl. No.: 12/990,947

(22) PCT Filed: May 14, 2009

(86) PCT No.: PCT/EP2009/055818
§ 371 (c)(1),
(2), (4) Date: Nov. 4, 2010

(87) PCT Pub. No.: WO2009/141261
PCT Pub. Date: Nov. 26, 2009

(65) Prior Publication Data
US 2011/0056309 A1    Mar. 10, 2011

(30) Foreign Application Priority Data
May 21, 2008 (FR) ...................................... 08 53295

(51) Int. Cl.
*G01L 3/02* (2006.01)
(52) U.S. Cl.
USPC .................................. 73/862.325; 73/862.08
(58) Field of Classification Search
USPC .......................... 73/862.325–862.326, 862.08
See application file for complete search history.

(56) References Cited

U.S. PATENT DOCUMENTS

| 4,602,515 | A | * | 7/1986 | Eichenlaub | 73/862.328 |
| 4,774,845 | A | * | 10/1988 | Barbe et al. | 73/862.328 |
| 4,989,460 | A | | 2/1991 | Mizuno et al. | |
| 5,182,953 | A | | 2/1993 | Ellinger et al. | |
| 6,851,324 | B2 | * | 2/2005 | Islam et al. | 73/862.328 |
| 6,851,325 | B2 | * | 2/2005 | Mir et al. | 73/862.335 |
| 7,579,827 | B2 | * | 8/2009 | Burns et al. | 324/173 |
| 2002/0124663 | A1 | * | 9/2002 | Tokumoto et al. | 73/862.333 |

FOREIGN PATENT DOCUMENTS

| DE | 198 17 886 | 10/1999 |
| FR | 2 595 821 | 9/1987 |
| GB | 2 213 275 | 8/1989 |

OTHER PUBLICATIONS

International Search Report issued Sep. 2, 2009 in PCT/EP09/055818 filed May 14, 2009.

* cited by examiner

*Primary Examiner* — Max Noori
(74) *Attorney, Agent, or Firm* — Oblon, Spivak, McClelland, Maier & Neustadt, L.L.P.

(57) ABSTRACT

A torque measurement device including: a power shaft transmitting rotary torque about the axis of the power shaft; a first wheel carrying angle marks, the wheel being secured to the power shaft; a reference shaft including a second wheel carrying angle marks; and a sensor placed facing at least one of the wheels to determine the torque transmitted by the power shaft. The first wheel includes first and second series of angle marks and the second wheel includes third and fourth series of angle marks. The marks of the first and third series are mutually parallel, while the marks of the second and fourth series are mutually parallel and are inclined relative to a first axial plane containing the axis, the marks of the first series being inclined relative to the marks of the second series, whereby the signal supplied by the sensor is representative of temperature of the power shaft.

11 Claims, 3 Drawing Sheets

DEVICE FOR MEASURING THE TORQUE TRANSMITTED BY A POWER SHAFT

The present invention relates to devices for measuring the torque transmitted by a shaft of an engine, e.g. a shaft of an aircraft turbine engine.

It should be recalled that measuring the rotary torque of a shaft is particularly important in the field of helicopter engines, since torque generally constitutes one of the data items that is it essential for the pilot to take into consideration in order to pilot the helicopter. Once the rotor of a helicopter presents a speed that is constant, its power depends exclusively on the torque.

In order to measure this torque, various solutions have been envisaged. Amongst them there are those that are based on measuring the deformation of the shaft in torsion, which deformation is a function of the transmitted torque, in particular.

The present invention provides a device that is based on such a measurement of the deformation of the shaft in torsion.

More precisely, the invention provides a torque measurement device comprising:
- a power shaft for transmitting rotary torque about an axis of the power shaft;
- a first wheel carrying angle marks, said first wheel being secured to the power shaft; and
- a reference shaft having a first end fastened to one end of the power shaft and a free second end that is provided with a second wheel carrying angle marks and that is on the same axis as the first wheel;
- a sensor placed facing at least one of said wheels and suitable for providing a signal representative of angular variation between the first and second wheels, said signal being designed to be transmitted to a calculation member suitable for determining the torque transmitted by the power shaft on the basis of the signal provided by the sensor.

Such a measurement device is shown in FIG. 1 of document FR 2 595 821. The magnetic sensors placed facing the teeth of the phonic wheels serves to detect angular variation between the phonic wheels, thus enabling the calculation member to determine the deformation of the power shaft in torsion so as subsequently to deduce the rotary torque.

However, as emphasized by that document, the stiffness of the power shaft in torsion is associated with the value of Young's modulus for the material constituting the shaft, and the value of this modulus is a function of temperature. In other words, it is necessary to take account of the temperature of the power shaft when calculating torque, since otherwise the value that is obtained is significantly erroneous.

In order to determine the temperature of the shaft, FR 2 595 821 envisages using additional sensors to measure the longitudinal expansion of the power shaft relative to the reference shaft, and to deduce the temperature therefrom. The measurement device of FR 2 595 821 is therefore complex to implement and bulky insofar as it has a plurality of magnetic sensors.

An object of the present invention is to propose a device for measuring the torque transmitted by a power shaft, which device requires fewer components and consequently presents reduced size, weight, and cost.

The invention achieves this object by the fact that:
- the first wheel includes first and second series of angle marks; and
- the second wheel includes third and fourth series of angle marks, the marks of the first and third series being mutually parallel, while the marks of the second and fourth series are mutually parallel while being inclined relative to a first axial plane containing the axis of the power shaft, the marks of the first series being inclined relative to the marks of the second series;
- whereby the signal provided by said sensor is also representative of the temperature of the power shaft.

Preferably, the first and second wheels are phonic wheels, and the angle marks of the first, second, third, and fourth series are constituted by teeth.

This particular configuration of the phonic wheels makes it possible, with a single sensor, advantageously to determine the angular deformation of the power shaft and also the temperature of the shaft so as to be subsequently in a position to deduce the torque that is actually being transmitted by the power shaft.

An advantage of the present invention is that it requires only one sensor, whereas prior art devices require a plurality of sensors in order to obtain a torque value that takes account of the temperature of the shaft.

The operation of the invention is explained below.

During rotation of the power shaft, the magnetic sensor detects the passage of teeth belonging to each of the series of teeth of the phonic wheels. The representative signal generated by the magnetic sensor thus constitutes a train of pulse signals in which, in outline, each "peak" corresponds to a tooth.

The calculation member is programmed so as to be capable of recognizing which tooth is associated with each peak in the signal.

The signal train transmitted by the sensor thus serves to determine a first angular difference between a tooth of the first series and a tooth of the third series, and also a second angular difference between a tooth of the second series and a tooth of the fourth series, it being possible to determine these angular differences from the durations between successive peaks.

Knowing the initial values of the differences between the teeth, it is possible to deduce a first angular difference variation between a tooth of the first series and a tooth of the third series, and also a second angular difference variation between a tooth of the second series and a tooth of the fourth series.

Each of the first and second angular difference variations contains information relating to deformation in torsion, and furthermore at least one of the determined variations also includes information relating to temperature.

Once the teeth of the second and fourth series of parallel teeth are themselves inclined relative to the first axial plane containing the axis of the power shaft, axial thermal expansion of the power shaft relative to the reference axis gives rise to a change in the angular difference between two teeth of these two series, which modification is representative of temperature.

In other words, the change in angular difference due to the temperature is added to the variation in angular difference due to the deformation of the shaft in torsion that results from transmitting torque.

Knowing the angle of inclination of the teeth, it becomes possible from the first and second angular difference variations to determine the angular variation that results solely from torsion of the power shaft, and the angular variation that results solely from the axial offset between the two shafts as a result of expansion, and it is thus from this variation representing the axial offset that temperature is determined.

The temperature and the angular difference variation due to deformation in torsion are then sent to the calculation member which, on the basis of a previously stored chart, is capable of calculating the value of the torque that is actually being transited by the power shaft.

Furthermore, in the meaning of the invention, a series of teeth may comprise a single tooth, or preferably a plurality of teeth.

Preferably, the first and second phonic wheels are arranged in such a manner that the teeth of the first phonic wheel alternate angularly with the teeth of the second phonic wheel.

It follows that in the signal train, two successive "peaks" belong to two teeth of two distinct phonic wheels. The angular differences can then be determined by considering the duration between any two successive teeth.

Still preferably, considered in the circumferential direction of the power shaft, there follow in succession a tooth of the first series, a tooth of the third series, a tooth of the second series, and a tooth of the fourth series.

The calculation member is advantageously programmed so as to be aware of this particular sequence.

In a first particularly advantageous embodiment of the present invention, considered in the circumferential direction of the power shaft, the teeth of the first and third series are parallel to the axis of the power shaft. Thus, the teeth of the first and third series extend in an axial plane, while the teeth of the second and fourth series extend in a plane that is inclined relative to the first axial plane.

Since the teeth of the first and third series are parallel to the axis of the power shaft, the first angular difference variation represents only the deformation in torsion of the power shaft. The axial offset due to expansion does not modify the angular difference between two teeth that are parallel to the axis.

In other words, from this first angular difference variation, it is possible to determine the angular variation that is the result solely of deformation in torsion.

Furthermore, as explained above, the second angular difference variation is constituted by the angular variation that results from the deformation in torsion together with the angular modification that is due to the axial expansion.

Insofar as said angular variation has already been determined from the first angular difference variation, it is advantageously possible to determine temperature by knowing the angle of inclination of the teeth of the second and fourth series of teeth.

Finally, the temperature and the angular variation that results from the deformation in torsion are sent to the calculation member that then determines the value of the torque actually being transmitted by the power shaft.

In a second particularly advantageous embodiment of the present invention, considered in the circumferential direction of the power shaft, the teeth of the first and third series are inclined relative to a second axial plane containing the axis of the power shaft by a predetermined angle, while the teeth of the second and fourth series are inclined relative to the first axial plane containing the axis of the power shaft by an angle opposite to said predetermined angle.

In this embodiment, both the first and the second angular difference variations contain information relating both to temperature and to the deformation of the power shaft in torsion.

Since the angle of inclination of the first and third series is opposite to the angle of inclination of the second and fourth series, the half-sum and the half-difference of the first and second variations respectively provide the looked-for temperature and angular variation.

In both of these embodiments, the reference shaft preferably extends axially inside the power shaft.

Advantageously, the series of teeth are disposed angularly over portions of the circumferences of their respective phonic wheels.

Finally, the present invention also provides a turbomachine including a device for measuring the torque being transmitted by a power shaft according to the invention.

The invention can be better understood and its advantages appear more clearly on reading the following description of two embodiments given as non-limiting examples. The description refers to the accompanying drawings, in which.

The torque measurement device of the present invention, also referred to as a torquemeter or a torsion indicator, may be used in numerous situations where it is desired to know the torque transmitted by a shaft. In the following detailed description, the measurement device is described in the particular but non-exclusive example of helicopter turbines, such as the gas turbine 9 shown in FIG. 1.

Figure 1:
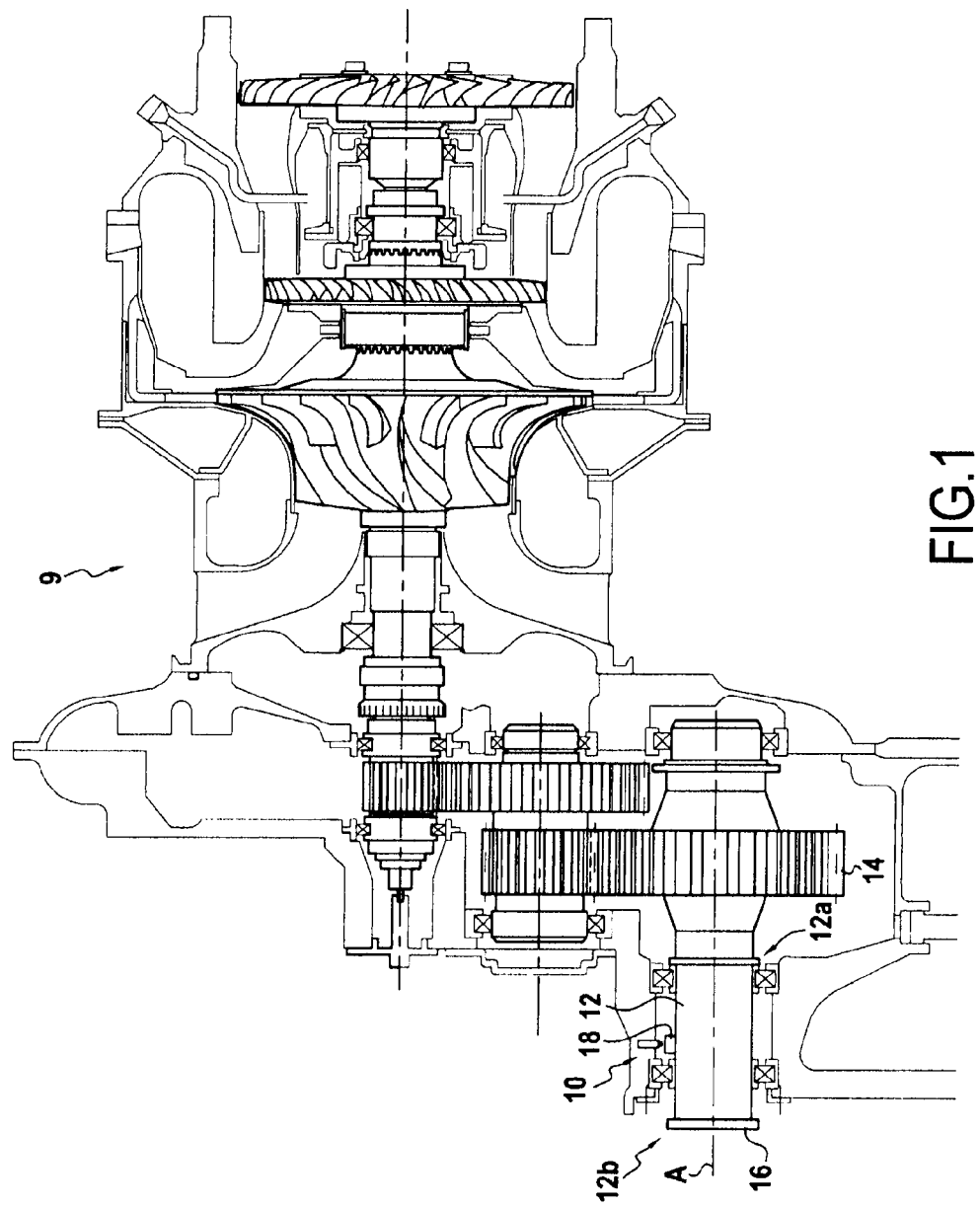
FIG. 1 shows a helicopter turbine engine fitted with a torque measurement device in accordance with the invention.

The torque measurement device 10 of the invention, shown in FIG. 1, is in the general form of a portion of a shaft having its ends for coupling to other shafts or to gears of the turbine engine.

In other words, the torque measurement device 10 comprises a hollow power shaft 12 for transmitting rotary torque about its axis A. This is the torque that is to be measured.

In the example of FIG. 1, the power shaft 12 has a gear 14 at its first end 12a, and a drive member 16 at its second end 12b opposite from its first end. Naturally, the ends of the power shaft could be fitted in some other way.

Furthermore, close to its second end 12b, the power shaft 12 carries a first wheel 18, specifically a phonic wheel 18 mounted coaxially thereon and comprising a plurality of angle marks, specifically teeth 19.

Figure 2:
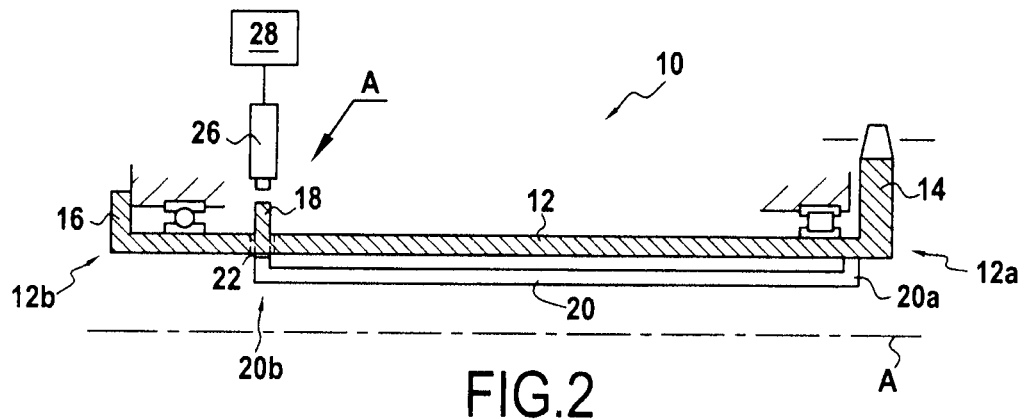
FIG. 2 is a half-view in axial section of a measurement device in accordance with the invention.
Figure 2B:
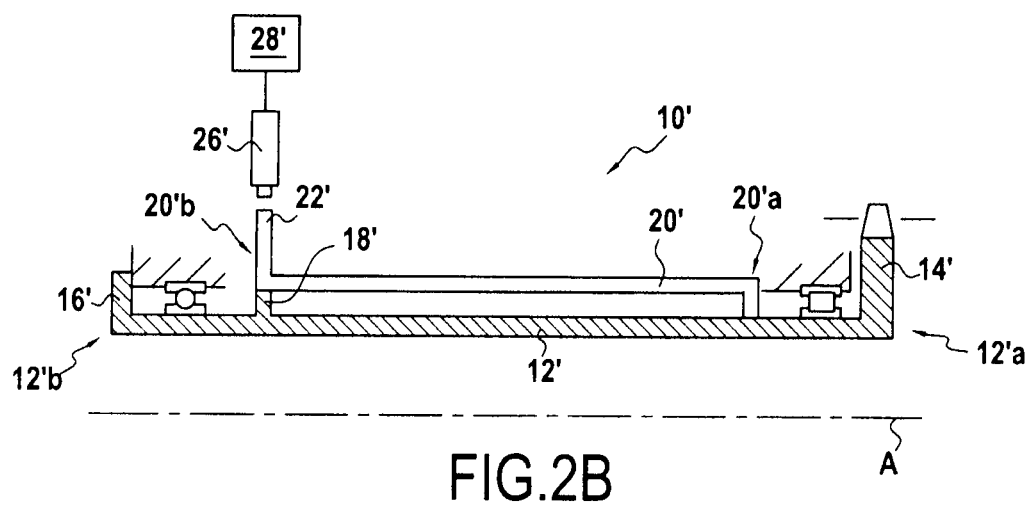
FIG. 2B is an axial half-view of a variant of the FIG. 2 device in which the reference shaft extends outside the power shaft.

As can be seen in FIG. 2, the measurement device also includes a reference shaft 20 extending axially inside the power shaft 12 to which it is fastened via its first end 20a close to the second end 12a of the power shaft 12, while its own second end 20b is free. FIG. 2b shows an alternative configuration for the measurement device in which the reference shaft 20' extends axially outside the power shaft 12' to which it is fastened via its first end 20a' close to the first end 12a' of the power shaft 12', while its own second end 20b' is free.

Figure 2A:
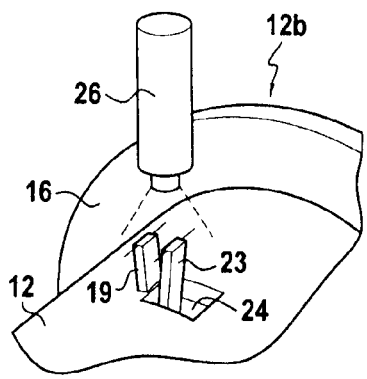
FIG. 2A is a detail of FIG. 1 showing an opening provided in the power shaft through which there extends a tooth of the second phonic wheel.

With reference once more to FIG. 2, it can be seen that the second end 20b of the reference shaft 20, opposite from its first end 20a, carries a second wheel 22, specifically of the phonic type, which wheel is on the same axis as the first phonic wheel 18. The second phonic wheel 22 carries a plurality of angle marks, specifically teeth 23, which, as can be seen better in FIG. 2A, extend radially through openings 24 formed in the power shaft 20.

Facing the teeth of the first and second phonic wheels 18 and 22 there is a single magnetic sensor 26 that is suitable for generating an electric signal each time a tooth passes in front of it, which signal is then sent to a calculation member 28 for determining the value of the torque transmitted by the power shaft 12.

Figure 3:
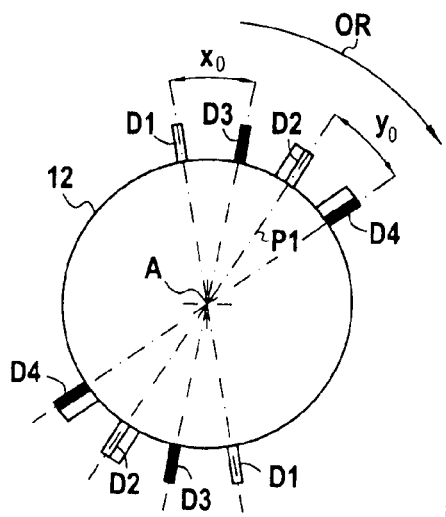
FIG. 3 is a radial section view showing the relative position of the teeth of the first and second phonic wheels.

FIG. 3 shows the angular distribution of the teeth of the first and second phonic wheels 18 and 22. In this example, the white teeth belong to the first phonic wheel 18 while the black teeth belong to the second phonic wheel 22.

In accordance with the invention, the first phonic wheel 18 carries a first series of teeth D1 that are identical to one another, and a second series of teeth D2 that are identical to one another, while the second phonic wheel 22 has a third series of teeth D3 that are identical to one another and a fourth series of teeth D4 that are identical to one another.

As can be seen in the figure, the first and second phonic wheels are arranged in such a manner that the teeth D1, D2 of the first phonic wheel 18 alternate angularly with the teeth D3, D4 of the second phonic wheel 22.

In the example described here, it can also be seen that each series of teeth comprises two teeth.

More precisely, when considered in the circumferential or "orthoradial" direction OR of the power shaft 12, as shown in FIGS. 4A to 5B, there follow in succession: a tooth D1 of the first series; a tooth D3 of the third series; a tooth D2 of the second series; and finally a tooth D4 of the fourth series.

When the power shaft is at rest, i.e. when it is not transmitting torque, the teeth D1 and D3 belonging respectively to the first and third series of teeth present a first angular difference $x_0$ that is known, while the teeth D2 and D4 belonging respectively to the second and fourth series of teeth present a second angular difference $y_0$, that is also known.

In contrast, when the power shaft 12 is transmitting torque, it tends to deform in torsion, to a greater or lesser extent depending both on the magnitude of the torque being transmitted and on the temperature of the power shaft.

It follows that during torque transmission by the power shaft 12, the teeth of the first and second phonic wheels tend to move relative to one another such that the values of the first and second angular differences change, as explained in the introduction.

Figure 4A:
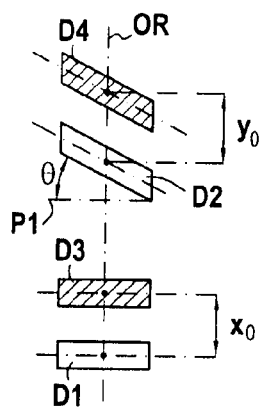
FIG. 4A shows the relative position of the teeth of the first and second phonic wheels of a first embodiment of the invention, considered in a circumferential direction of the phonic wheels when the power shaft is at rest.
Figure 4B:
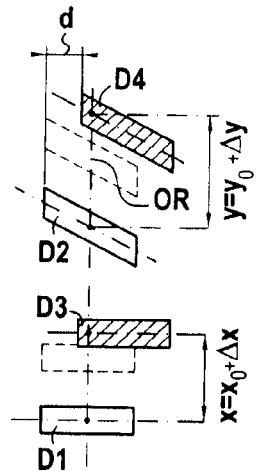
FIG. 4B shows the relative position of the teeth of the first and second phonic wheels of FIG. 4A when the power shaft is transmitting torque.

With reference to FIGS. 4A and 4B, there follows a description of a first embodiment of the invention. These figures are considered in a circumferential direction OR of the phonic wheels. They are therefore diagrammatic representations of the relative positions of the teeth as though the circumferences of the phonic wheels were straight.

In accordance with the invention, the teeth D1 and D3 of the first and second series are mutually parallel, while the drive shaft D2 and D4 of the second and fourth series are mutually parallel while also being inclined relative to a first axial plane P1 that contains the axis A of the power shaft 12, the teeth D1 of the first series being inclined relative to the teeth D2 of the second series.

In this particular embodiment, the teeth D1 and D3 of the first and third series are parallel to the axis A of the power shaft 12, i.e. they extend in two axial planes, while the teeth D2 and D4 of the second and fourth series are inclined at an angle θ relative to the first axial plane P1. In other words, each of the teeth D2 and D4 extend in a plane that makes an angle θ relative to the first axial plane P1.

FIG. 4A shows the relative position of the teeth D1, D2, D3, and D4 at rest, while no torque is being transmitted by the power shaft 12.

In the rest state, the first angular difference is then equal to $x_0$, while the second angular difference is equal to $y_0$.

FIG. 4B shows the relative position of the same teeth while the power shaft is transmitting torque, it being specified at this point that the power shaft 12 is at a temperature T.

It can be seen in the figure that the tooth D1 has moved angularly away from the tooth D3 by a value Δx, referred to as the first angular difference variation, while the tooth D2 has moved angularly away from the tooth D4 by a value Δy referred to as the second angular difference variation.

Furthermore, the power shaft 12 has moved axially away from the reference shaft 20 because of a differential temperature expansion phenomenon due to the increase in the temperature of the engine and to the respective expansion coefficients of the shafts.

Because of inclination of the tooth D4, the second angular difference variation Δy is equal to the first angular difference variation Δx plus an expansion angular variation Δz corresponding solely to thermal expansion. This latter variation value is proportional to the difference in axial expansion shown by the reference d. Consequently, the expansion angular variation Δz is thus a function of the temperature T of the power shaft insofar as the axial expansion d is itself a function of temperature.

In contrast, the first angular difference variation Δx measures only the angular deformation between the two phonic wheels 18, 22 insofar as the teeth of the first and third series are parallel to the direction of axial deformation by expansion, so the expansion has no effect on the angular variation between the teeth D1 and D3.

The magnetic sensor 26 that generates signal trains sends this information to the calculation member 28, which is capable of distinguishing between the various signals and of calculating the first and second angular difference variations. Thereafter, by subtracting the second and first angular variations, it is possible to obtain the expansion angular variation Δz from which it is possible to deduce the temperature T.

Finally, the calculation member 28 determines the value of the torque transmitted by the power shaft 12 from the calculated temperature T and from the first angular difference variation Δx corresponding to the twisting deformation between the two phonic wheels, by using a previously stored chart. Said chart may be in the form of a database containing torque values as a function of temperature and as a function of angular difference variation. It may be established beforehand in the workshop.

Figure 5A:
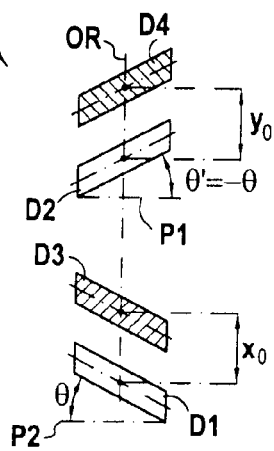
FIG. 5A shows the relative position of the teeth of the first and second phonic wheels of a second embodiment of the invention, considered in a circumferential direction of the phonic wheels when the power shaft is not transmitting torque.
Figure 5B:
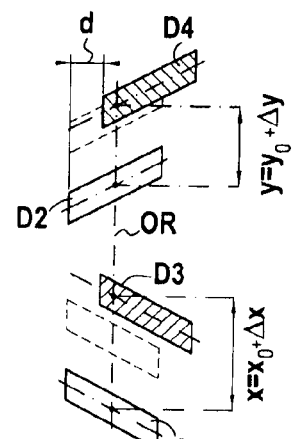
FIG. 5B shows the relative position of the teeth of the first and second phonic wheels of FIG. 5A when the power shaft is transmitting torque.

FIGS. 5A and 5B show a second embodiment that differs from the first in that the teeth D1 and D3 of the first and third series of teeth are not parallel to the axis X of the power shaft 12, but are inclined at an angle θ relative to a second axial plane P2 that contains the axis A of the power shaft 12. The angle θ is thus opposite to the angle of inclination θ' of the teeth D2 and D4 of the second and fourth series of teeth.

FIG. 5A shows the relative position of the teeth D1, D2, D3, and D4 while no torque is being transmitted by the power shaft 12.

In the rest state, the first angular difference is then equal to $x_0$, while the second angular difference is equal to $y_0$.

FIG. 5B shows the relative position between the same teeth while the power shaft is transmitting torque, it being specified that at this moment, the power shaft 12 is at the temperature T.

This time, the first and second angular difference variations Δx and Δy are each equal to the angular variation between the two phonic wheels plus an angular difference component that is due to expansion. Since the pairs of teeth D1 & D3 and D2 & D4 are inclined at opposite angles, it follows that the angular difference component due to expansion contained in the first and second angular difference variations are opposite, such that by adding the first and second angular difference variations the result is twice the angular deformation between the two phonic wheels, while by subtracting the first and second angular difference variations, the result is twice the angular difference component that is due to the expansion, from which the temperature T is deduced.

The two items of information needed to enable the calculation member to calculate the torque being transmitted by the power shaft are thus once more available.

The invention claimed is:

1. A torque measurement device comprising:
a power shaft that transmits rotary torque about an axis;
a first wheel carrying angle marks, the first wheel being secured to the power shaft;
a reference shaft including a first end fastened to one end of the power shaft and a free second end that includes a second wheel carrying angle marks and that is on a same axis as the first wheel;
a sensor disposed facing at least one of the wheels and configured to provide a signal representative of angular variation between the first and second wheels; and
a calculation member configured to determine torque transmitted by the power shaft based on the signal provided by the sensor,
wherein:
the first wheel includes first and second series of angle marks; and
the second wheel includes third and fourth series of angle marks, the marks of the first and third series being mutually parallel, while the marks of the second and fourth series are mutually parallel while being inclined relative to a first axial plane containing the axis of the power shaft, the marks of the first series being inclined relative to the marks of the second series, whereby the signal provided by the sensor is also representative of temperature of the power shaft, and
when the calculation member is configured to determine the torque transmitted by the power shaft based on a first angular difference variation between the first series of angle marks and the third series of angle marks, and a second angular difference variation between the second series of angle marks and the fourth series of angle marks, and
the second angular difference variation differs from the first angular difference variation by an angular variation resulting from thermal expansion.

2. The torque measurement device according to claim 1, wherein the first and second wheels are phonic wheels, and the angle marks are teeth.

3. The torque measurement device according to claim 2, wherein the first and second phonic wheels are arranged such that the teeth of the first phonic wheel alternate angularly with the teeth of the second phonic wheel.

4. The torque measurement device according to claim 3, wherein, considered in the circumferential direction of the power shaft, there follow in succession a tooth of the first series, a tooth of the third series, a tooth of the second series, and a tooth of the fourth series.

5. The torque measurement device according to claim 2, wherein, considered in the circumferential direction of the power shaft, teeth of the first and third series are parallel to the axis of the power shaft.

6. The torque measurement device according to claim 2, wherein, considered in the circumferential direction of the power shaft, teeth of the first and third series are inclined relative to a second axial plane including the axis of the power shaft by a predetermined angle, while teeth of the second and fourth series are inclined relative to the first axial plane containing the axis of the power shaft by an angle opposite to the predetermined angle.

7. The torque measurement device according to claim 2, wherein the series of teeth are defined angularly over portions of the circumferences of their respective phonic wheels.

8. The torque measurement device according to claim 1, wherein the reference shaft extends axially inside the power shaft.

9. A turbomachine comprising a torque measurement device according to claim 1.

10. The torque measurement device according to claim 1, wherein at most one sensor is disposed facing at least one of the wheels and configured to provide a signal representative of angular variation between the first and second wheel.

11. The torque measurement device according to claim 1, wherein the calculation member determines a value of torque transmitted by the power shaft from a temperature and the first angular difference variation by using a previously stored chart.

* * * * *